United States Patent
Minato

(10) Patent No.: US 9,401,670 B2
(45) Date of Patent: Jul. 26, 2016

(54) ELECTRIC PUMP

(71) Applicant: Aisin Seiki Kabushiki Kaisha, Kariya-shi (JP)

(72) Inventor: Yoshihiko Minato, Chiryu (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/613,701

(22) Filed: Feb. 4, 2015

(65) Prior Publication Data

US 2015/0263653 A1    Sep. 17, 2015

(30) Foreign Application Priority Data

Mar. 14, 2014    (JP) .................................. 2014-052255

(51) Int. Cl.
| | |
|---|---|
| *H02P 6/08* | (2016.01) |
| *H02P 6/00* | (2016.01) |
| *F04B 49/06* | (2006.01) |

(52) U.S. Cl.
CPC .............. *H02P 6/002* (2013.01); *F04B 49/06* (2013.01); *F04B 2203/0201* (2013.01); *F04B 2203/0202* (2013.01)

(58) Field of Classification Search
CPC .............. H02P 6/08; H02P 6/00; H02P 6/002
USPC ................................ 318/400.09, 400.01, 700
See application file for complete search history.

(56) References Cited

U.S. PATENT DOCUMENTS

| | | | |
|---|---|---|---|
| 2005/0183416 A1* | 8/2005 | Hayashi | B62D 5/07 60/445 |
| 2010/0244754 A1 | 9/2010 | Marumoto et al. | |
| 2012/0306416 A1* | 12/2012 | Hano | B60L 1/003 318/400.26 |
| 2012/0308403 A1* | 12/2012 | Minato | F04B 15/02 417/32 |
| 2013/0171010 A1* | 7/2013 | Kagawa | F04B 17/03 417/300 |
| 2015/0010408 A1* | 1/2015 | Kagawa | F04B 49/06 417/43 |

FOREIGN PATENT DOCUMENTS

| | | | | |
|---|---|---|---|---|
| JP | 2004-166436 | 6/2004 | | |
| JP | 2012-31832 | 2/2012 | | |
| WO | WO 2013100017 A1 * | 7/2013 | .............. | F04B 49/06 |

* cited by examiner

*Primary Examiner* — Kawing Chan
(74) *Attorney, Agent, or Firm* — Oblon, McClelland, Maier & Neustadt, L.L.P.

(57) ABSTRACT

An electric pump includes a pump body, a sensorless brushless motor, and a control portion controlling the motor to perform a constant current control and a constant voltage control to discharge a necessary discharge amount of an operation fluid from the pump body, the control portion controlling the motor to switch from the constant current control to the constant voltage control at a predetermined temperature of the operation fluid and at a predetermined motor applied voltage. The control portion controls the motor to switch from the constant current control to the constant voltage control at a motor applied voltage which is higher than the predetermined motor applied voltage when a temperature of the operation fluid is lower than the predetermined temperature to discharge the necessary discharge amount of the operation fluid from the pump body.

3 Claims, 3 Drawing Sheets

ELECTRIC PUMP

CROSS REFERENCE TO RELATED APPLICATIONS

This application is based on and claims priority under 35 U.S.C. §119 to Japanese Patent Application 2014-052255, filed on Mar. 14, 2014, the entire content of which is incorporated herein by reference.

TECHNICAL FIELD

This disclosure generally relates to an electric pump.

BACKGROUND DISCUSSION

With consideration for global environmental issues, a known vehicle, for example, an automobile is provided with an idling stop controlling function which stops an engine when the vehicle is stopped at, for example, an intersection for a short time and prevents the emission of exhaust gas and the consumption of gasoline. When the idling stop controlling function is operated, the engine is not performed. However, in such a case, because the oil pressure level of a transmission is required to be maintained, an electric pump which can be driven to supply the oil (an example of operation fluid) even when the engine is not performed is used to maintain the oil pressure level of the transmission.

Because the electric pump is disposed at an engine room, the secure operation of the electric pump at high temperature is required. Thus, the electric pump is usually driven by a sensorless brushless motor (hereinafter referred to as a motor) that does not include mechanical contacting portions such as a brush and a commutator and that does not include a magnetic pole sensor, for example, a Hall element. The sensorless brushless motor detects a rotary position of a rotor by using an inductive voltage which is induced by a coil wound on a stator. The sensorless brushless motor switches the energization of each phase among three-phase windings in response to the information of magnetic pole position which is obtained by the detection of the rotary position of the rotor.

An electric fluid pump device disclosed in JP2004-166436A (hereinafter referred to as Patent reference 1) is provided with a brushless direct current (DC) motor which is driven by pulse width modulation (PWM) signals by an application of a sensorless driving circuit. The electric fluid pump device disclosed in Patent reference 1 includes a control unit that drives the brushless DC motor by current control and that switches the control of the motor from the current control to a rotational speed control when the rotational speed of a motor comes to be equal to or lower than a predetermined rotational speed of the motor. Accordingly, in a case where the rotational speed of the motor is greater than the predetermined rotational speed, the motor is controlled by the current control. When the load fluctuation of the motor occurs, the control unit switches the control of the motor from the current control to the rotational speed control in a case where a voltage applied on the motor decreases because of the current control and thereby the rotational speed of the motor decreases. The control unit switches the control of the motor from the current control to the rotational speed control in a case where the rotational speed of the motor comes to be equal to or lower than the predetermined rotational speed, so that the inductive voltage generated on the coil is prevented from decreasing, thereby inhibiting a loss of synchronism of the motor.

Further, a known electric pump supplying a necessary amount of an oil to a transmission even at a low temperature (mostly below zero Centigrade) is required. When a motor control is performed by an application of a voltage which is equivalent to a voltage applied to a motor when the oil is in a normal temperature, because the viscosity of the oil is increased at the low temperature, a rotary speed of the motor decreases because of the increase of a load applied to the motor in accordance with the increase of the viscosity of the oil. Because a discharge amount of the oil from the electric pump is insufficient, the required amount of oil cannot be supplied to the transmission. Further, because an inductive voltage generated on a coil decreases in accordance with the decrease of a rotary speed of the motor, the motor is stepped out when the rotary position of a rotor is not detected. In order to set the rotary speed of the motor equal to or higher than a predetermined amount at the low temperature by an application of the voltage on the motor, the voltage which is an equivalent to the voltage applied on the motor at a normal temperature, the upsizing of the motor is required to generate a large amount of a torque, thereby the electric pump using a sensorless brushless motor is inefficient in terms of space, weight and cost of the motor.

A need thus exists for an electric pump which is not susceptible to the drawback mentioned above.

SUMMARY

According to an aspect of this disclosure, an electric pump includes a pump body pumping up and discharging an operation fluid, a sensorless brushless motor driving the pump body; and a control portion controlling the motor to perform a constant current control and a constant voltage control to discharge a necessary discharge amount of the operation fluid from the pump body, the control portion controlling the motor to switch from the constant current control to the constant voltage control at a predetermined temperature of the operation fluid and at a predetermined motor applied voltage. The control portion controls the motor to switch from the constant current control to the constant voltage control at a motor applied voltage which is higher than the predetermined motor applied voltage when a temperature of the operation fluid is lower than the predetermined temperature to discharge the necessary discharge amount of the operation fluid from the pump body.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
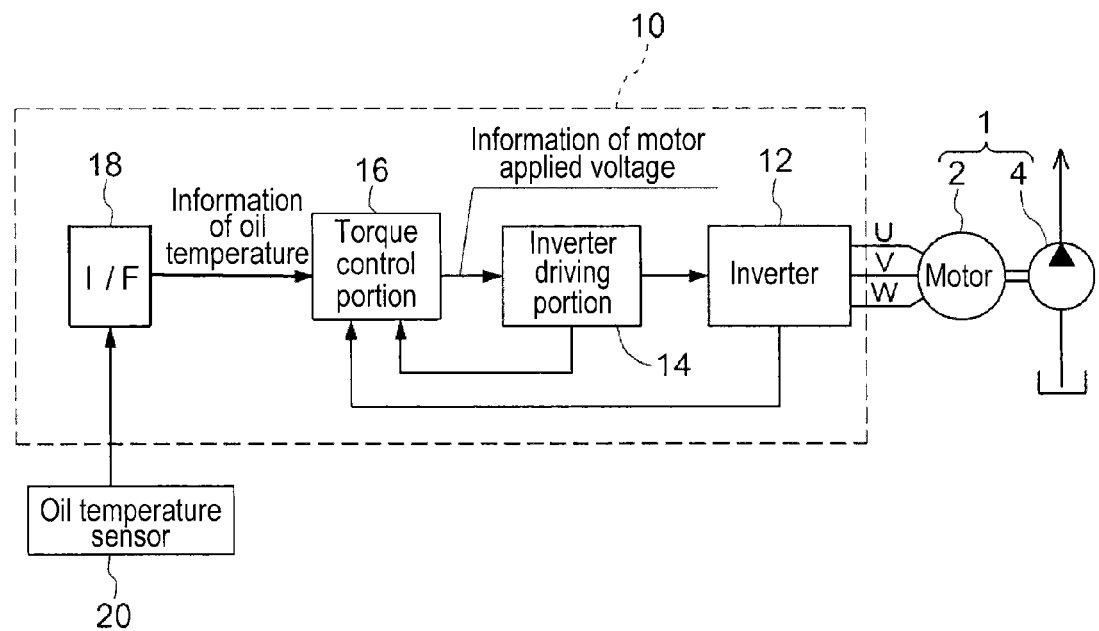
FIG. 1 is a block diagram schematically illustrating a construction of an electric pump and an electronic control unit of a motor according to an embodiment disclosed here.

An embodiment of this disclosure will be described with reference to the drawings. As shown in FIG. 1, an electric pump 1 includes a sensorless brushless motor 2 (hereinafter referred to as a motor 2) and an oil pump 4 (i.e., serving as a pump body). The motor 2 is directly connected to a shaft. The oil pump 4 is driven by the motor 2. The oil pump 4 is an example of the pump body. The construction of the oil pump 4 is equivalent to the construction of a known oil pump so that detailed explanations will not be described. The motor 2 is controlled to be driven by an Electronic Control Unit (ECU) 10 (i.e., serving as a control portion), thereby operating the oil pump 4.

The ECU 10 is provided with an inverter 12, an inverter driving portion 14, a torque control portion 16 and an interface (I/F) 18. The inverter 12 outputs pulse width modulation (PWM) signals which activate the motor 2. The inverter driving portion 14 controls the inverter 12. The torque control portion 16 commands the control to the inverter driving portion 14. The torque control portion 16 outputs information of a motor applied voltage, that is, information of the applied voltage on the motor 2 and controls the motor 2 via the inverter driving portion 14 and the inverter 12. During the rotation of the motor 2, each of the inverter 12 and the inverter driving portion 14 feed backs the driving information of the motor 2 (for example, an energizing current value to a coil and the rotational speed of the motor 2) to the torque control portion 16. The ECU 10 can be configured separately from or integrally with the electric pump 1.

Figure 2:
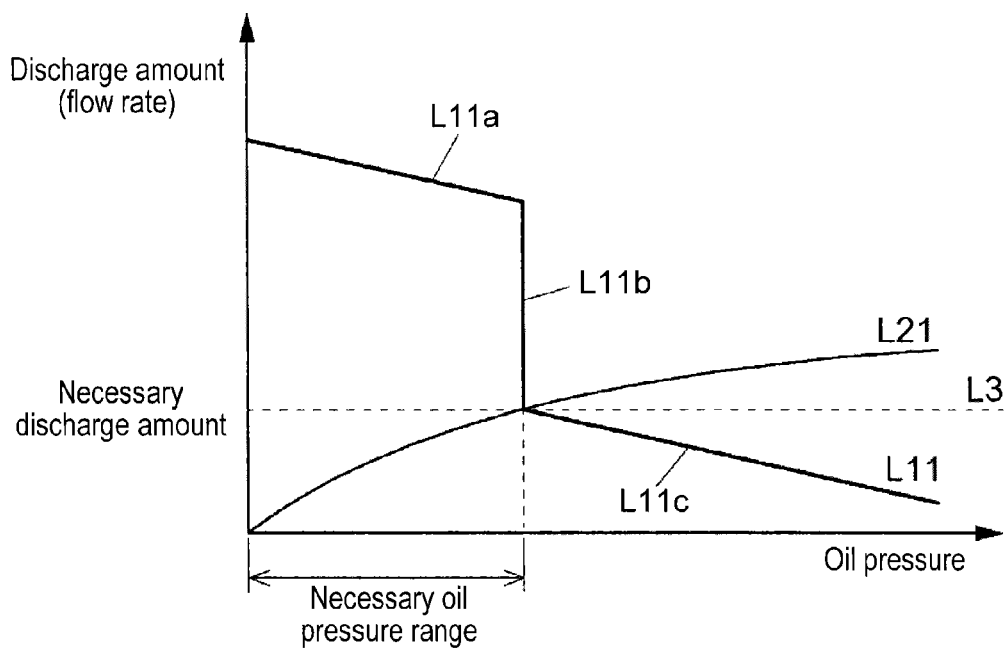
FIG. 2 is a graph showing a pump characteristic of an electric pump and a load characteristic of an oil required at a destination of the oil when the oil is in a normal temperature.

The oil pump 4 of the electric pump 1 pumps up and discharges an oil which is an example of an operation fluid by the drive of the motor 2. The relation between the discharge oil amount and the oil pressure level when the oil is discharged (hereinafter referred to as an oil pressure level) corresponds to the relation between the rotational speed of the motor 2 and the torque generated when the motor is rotated. L11 in FIG. 2 shows the relation between the oil pressure level and the amount of the oil discharged from the oil pump 4. Hereinafter, the relation is referred to as a pump characteristic. A range L11a corresponds to a range where the motor 2 does not have a feedback control, so that the discharge oil amount decreases in accordance with the increase of the oil pressure level. That is, when the oil pressure level is zero, the rotational speed of the motor 2 comes to be at the maximum level and therefore the discharge oil amount comes to be at the maximum level. In a case where the oil pressure level increases, the resistance occurs when the oil is discharged. Accordingly, the discharge oil amount is decreased. That is, the rotational speed of the motor 2 decreases. At the range L11a, the duty ratio of PWM signals maintains a constant value, for example, 100 percent. Hereinafter, the amount of the duty ratio of the outputted PWM signals is shown as the amount of the motor applied voltage. At the range L11a, in accordance with the increase of the oil pressure level, the load on the motor 2 increases and the rotation speed decreases, so that the discharge oil amount decreases. At this time, the current flowing on the coil of the motor 2 increases while maintaining the motor applied voltage at the constant value. When the current value reaches a predetermined value, the torque control portion 16 controls the motor 2 to switch from a constant voltage control to a constant current control and controls the motor applied voltage to be decreased while maintaining the current applied on the motor 2 at a constant value. At a range L11b, the constant current control is performed. When the constant current control is performed on the motor 2, the rotational speed of the motor 2 decreases while the current applied on the motor 2 is maintained to be the constant value. That is, the discharge oil amount decreases while the oil pressure level is maintained at a constant value.

When the rotational speed of the motor 2 decreases, the inductive voltage generated on the coil wound on a stator decreases. The motor 2 detects the rotary position of the rotor by the inductive voltage. Accordingly, when the inductive voltage comes to be lower than a predetermined value, the motor 2 cannot detect the rotary position of the rotor, thereby being stepped out and stopped. Thus, the ECU 10 controls the motor 2 to switch from the constant current control to the constant voltage control at the predetermined rotational speed at which the inductive voltage for detecting the rotary position of the rotor is obtained. As shown in FIG. 2, at a range L11c, the constant voltage control is performed on the motor 2. At the range L11c, similarly to the range L11a, in accordance with the increase of the oil pressure level, the load on the motor 2 increases and the rotation speed decreases, so that the discharge oil amount decreases. The range L11c continues until the discharge oil amount of the oil pump 4 decreases to reach the discharge oil amount at the rotational speed which causes the step-out of the motor 2.

In FIG. 2, L21 shows the relation between the oil pressure level and the flow rate of the oil required by a transmission when the oil temperature corresponds to, for example, a normal temperature (hereinafter referred to as a temperature T1). Hereinafter, this relation is referred to as a load characteristic. The oil pump 4 is required to include a capability to discharge the oil to the predetermined amount regardless of the oil temperature. As shown in FIG. 2, L3 shows the predetermined discharge oil amount (hereinafter referred to as a necessary discharge amount).

At a range of the oil pressure level (hereinafter referred to as a necessary oil pressure range) necessary for discharging the desirable amount of the oil from zero to the necessary discharge amount by the oil pump 4, L11 is required to be constantly equal to or higher than L21 for the oil pump 4 to constantly supply the necessary amount of the oil to the transmission. That is, at the necessary oil pressure range, the discharge oil amount discharged from the oil pump 4 by the pump characteristic is required to be higher than the oil flow rate required by the load characteristic. As shown in FIG. 2, because this condition is satisfied when the oil temperature corresponds to the temperature T1 (normal temperature), the oil pump 4 constantly supplies the necessary oil amount to the transmission. The load characteristic differs in accordance with the oil temperature and is predetermined by the specification of the transmission. The rotational speed of the motor 2 when the oil pump 4 discharges the necessary oil amount is largely higher than the rotational speed of the motor 2 when the motor 2 is stepped out.

As shown in FIG. 2, the ECU 10 controls the motor 2 to perform the constant current control when the oil pressure level is at the maximum level in the necessary oil pressure range. Further, the ECU 10 controls the motor 2 to switch from the constant current control to the constant voltage control by the motor applied voltage which is applied when the oil pump 4 discharges the necessary discharge amount of the oil. Accordingly, the ECU 10 controls the output of the motor 2 most effectively.

Figure 3:
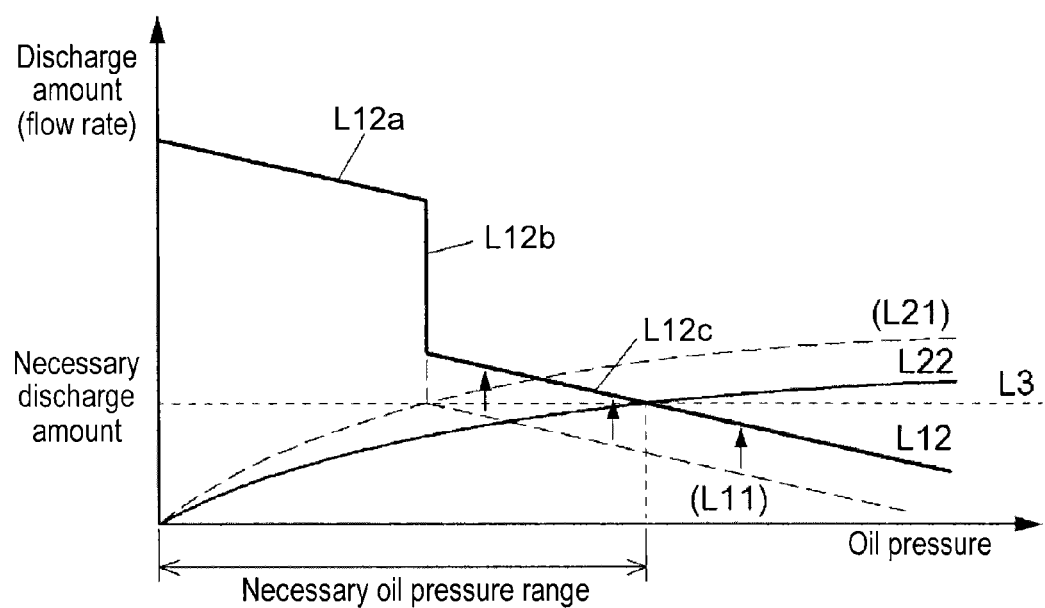
FIG. 3 is a graph showing a pump characteristic of the electric pump and a load characteristic of the oil required at the destination of the oil when the oil is in a low temperature.

FIG. 3 shows a graph illustrating the pump characteristic and the load characteristic when the oil temperature is lower than the temperature T1. The oil temperature which is lower than the temperature T1 is, for example, a temperature T0.

L22 (load characteristic) shows the oil discharge amount which is less than the oil discharge amount of L21 under the same oil pressure level because the oil viscosity is higher at the temperature T0 than the oil viscosity at the temperature T1. Observing dotted-line L11 (which is the same as L11 in FIG. 2) illustrating the pump characteristic and L22 illustrating the load characteristic at the temperature T0, the pump characteristic (L11) is lower than the load characteristic (L22) at the oil pressure level which is necessary for obtaining the necessary discharging amount, that is, at the maximum oil pressure level in the necessary oil pressure range. That is, the output of the motor 2 is inadequate, so that the oil pump 4 cannot discharge the necessary oil amount.

Practically, even when the pump characteristic (L11) is higher than the load characteristic (L22), the discharge amount of the oil discharged from the oil pump 4 is sometimes lower than the necessary discharge amount (L3), indicating that the output of the motor 2 is inadequate.

According to the embodiment, the ECU 10 increases the motor applied voltage when the ECU 10 controls the motor 2 to switch from the constant current control to the constant voltage control to increase the output of the motor 2. That is, the discharged oil amount increases. Accordingly, the motor 2 supplies the necessary amount of the oil to the transmission. Hereinafter, the motor applied voltage when the ECU 10 controls the motor 2 to switch from the constant current control to the constant voltage control is referred to as a motor applied voltage at switching. L12 (ranges L12a, L12b, and L12c) in FIG. 3 shows the pump characteristic when the ECU 10 increases the motor applied voltage at switching. The discharged oil amount increases in the range L12c. In particular, the ECU 10 sets the pump characteristic (L12) in which the oil pump 4 discharges equal to or higher than the necessary discharge oil amount at the oil pressure level where the line showing the load characteristic (L22) intersects with the line showing the necessary discharge amount (L3). Accordingly, the oil pump 4 can discharge the desirable discharge amount of the oil up to the necessary discharge amount even at the temperature T0.

As shown in FIG. 3, the ECU 10 controls the motor 2 to perform the constant voltage control so that that the line of L12 passes through the intersection of the load characteristic (L22) and the necessary discharge amount (L3). Accordingly, the output of the motor 2 is most effectively controlled.

Figure 4:
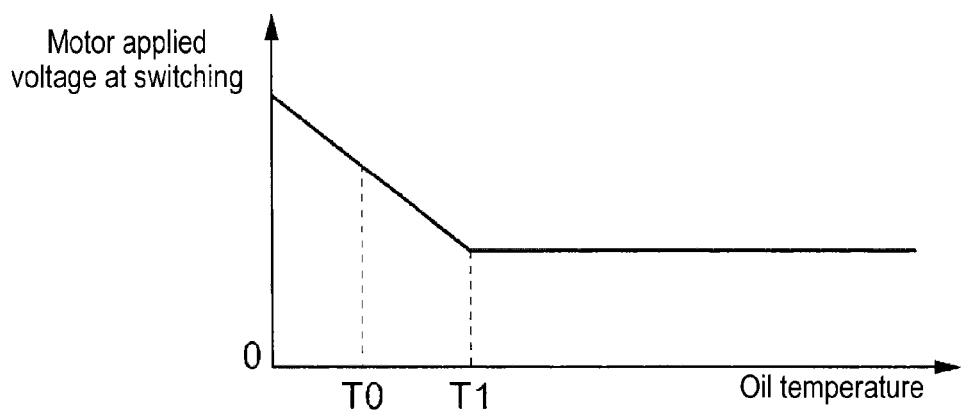
FIG. 4 is a graph showing a change of an applied voltage on a motor when an electronic control unit switches a control of a motor from a constant current control to a minimum output control in accordance with an oil temperature.

In a case where the oil temperature is below the temperature T1 and the oil pump 4 cannot discharge the necessary discharge amount (L3) of the oil, the torque control portion 16 controls the motor 2 to increase the motor applied voltage at switching when the oil temperature is below the temperature T1 to increase the output of the motor 2 in accordance with the information of the oil temperature obtained from the oil temperature sensor 20 via the interface 18. Arrows in FIG. 3 indicate the increase of the discharged amount. The lower the oil temperature, the higher the viscosity of the oil, so that the motor applied voltage at switching increases as the oil temperature decreases as shown in FIG. 4. In a case where the motor applied voltage at switching increases, the output (generated torque) of the motor 2 when the constant voltage control is performed increases, so that the motor 2 can be rotated at the rotational speed which can discharge the necessary discharge amount of the oil by the oil pump 4 even if the viscosity of the oil is high. In FIG. 4, the motor applied voltage at switching increases linearly as the oil temperature decreases from the temperature T1, however, is one of the examples. The motor applied voltage at switching does not have to increase linearly as long as the minimum motor applied voltage is set to establish a pump characteristic that is higher than a load characteristic throughout the necessary oil pressure range at each temperature below the temperature T1.

Figure 5:
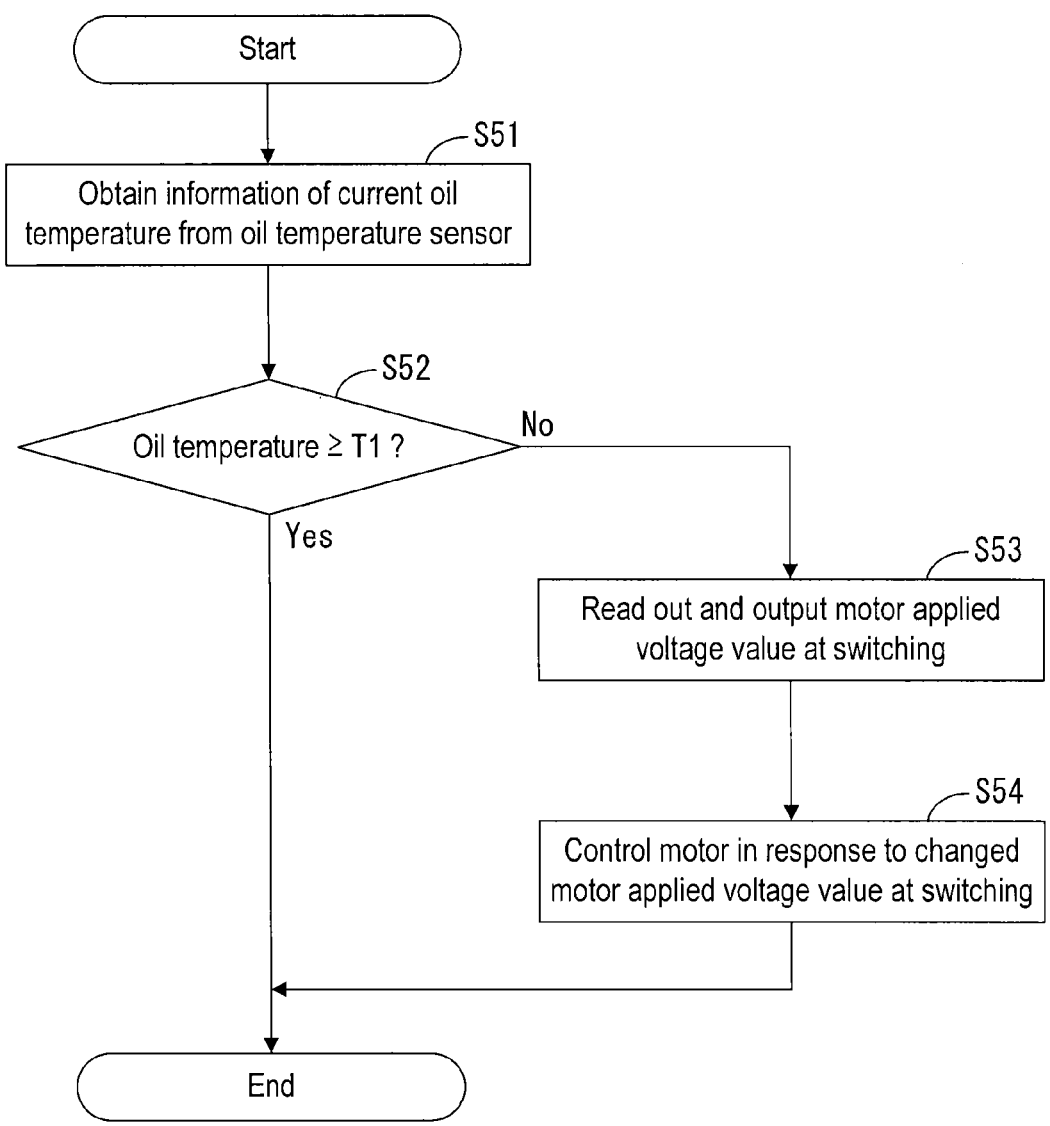
FIG. 5 is a flowchart showing a control process to increase the applied voltage on the motor when the electronic control unit switches the control of the motor from the constant current control to the minimum output control.

FIG. 5 shows a flow chart of the control process to increase the motor applied voltage at switching. As shown in FIG. 1, an oil temperature sensor 20 detecting the temperature of the oil supplied to the transmission is mounted to the inside and proximity of the transmission. The interface 18 receives the information of the oil temperature detected by the oil temperature sensor 20. The torque control portion 16 obtains the oil temperature information constantly from the oil temperature sensor 20 via the interface 18 (S51). The torque control portion 16 has a table (i.e., serving as a map) of the information of the motor applied voltage at switching on the basis of the load characteristic and the necessary discharge amount at each oil temperature of the temperature range applied to the electric pump 1. The table is graphically shown in FIG. 4. The torque control portion 16 determines whether the oil temperature obtained from the oil temperature sensor 20 is equal to or higher or lower than the temperature T1 (S52). In a case where the oil temperature is equal to or higher than the temperature T1, the ECU 10 does not increase the motor applied voltage at switching. In a case where the oil temperature is lower than the temperature T1, the torque control portion 16 reads out the information of the motor applied voltage at switching on the basis of the table and outputs the information to the inverter driving portion 14 (S53). The inverter driving portion 14 controls the inverter 12 to switch the control of the motor 2 from the constant current control to the current voltage control at the inputted motor applied voltage at switching (S54). Accordingly, the minimum output of the motor 2 increases.

As described above, the motor applied voltage at switching which can discharge the necessary discharge amount of the oil by the oil pump 4 is set in accordance with each oil temperature of the temperature range applied to the electric pump 1. Accordingly, similarly to the case where the oil temperature is normal, the electric pump 1 supplies the necessary amount of the oil to the transmission even when the oil temperature decreases.

According to the aforementioned embodiment, the motor 2 which is driven by PWM signals is used for explanation, however is not limited. Alternatively, a motor which is driven by other desirable means is applied.

Regarding to the industrial applicability, this disclosure is applicable to the electric pump which is driven by a sensorless brushless motor.

According to the aforementioned embodiment, the electric pump 1 includes the oil pump 4 pumping up and discharging the operation fluid, the sensorless brushless motor 2 driving the oil pump 4, and the ECU 10 controlling the motor 2 to perform the constant current control and the constant voltage control to discharge the necessary discharge amount of the operation fluid from the oil pump 4, the ECU 10 controlling the motor 2 to switch from the constant current control to the constant voltage control at the predetermined temperature of the operation fluid and at the predetermined motor applied voltage. The ECU 10 controls the motor 2 to switch from the constant current control to the constant voltage control at the motor applied voltage which is higher than the predetermined motor applied voltage when the temperature of the operation fluid is lower than the predetermined temperature to discharge the necessary discharge amount of the operation fluid from the oil pump 4.

According to the aforementioned construction, the ECU 10 controls the motor 2 to switch from the constant current control to the constant voltage control at the motor applied voltage which is higher than the predetermined motor applied voltage to increase the output of the motor 2 in a case where the temperature of the operation fluid decreases below the predetermined temperature, so that the viscosity of the oil increases. Accordingly, the oil pump 4 discharges the amount of the oil required by the transmission.

According to the aforementioned embodiment, the motor applied voltage is defined on a basis of the table indicating the relation between the temperature of the operation fluid and the motor applied voltage.

According to the aforementioned construction, the motor applied voltage does not have to be calculated at each time, thereby a prompt control is available.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An electric pump, comprising:
    a pump body pumping up and discharging an operation fluid;
    a sensorless brushless motor driving the pump body; and
    an electronic control unit controlling the motor to perform a constant current control and a constant voltage control to discharge a necessary discharge amount of the operation fluid from the pump body, the electronic control unit controlling the motor to switch from the constant current control to the constant voltage control at a predetermined temperature of the operation fluid and at a predetermined motor applied voltage,
    wherein the electronic control unit controls the motor to switch from the constant current control to the constant voltage control,
    wherein at switching, the electronic control unit increases linearly the motor applied voltage to a motor applied voltage that is higher than the predetermined motor applied voltage when a temperature of the operation fluid is lower than the predetermined temperature to discharge the necessary discharge amount of the operation fluid from the pump body.

2. The electric pump according to claim 1, wherein the motor applied voltage is defined on a basis of a map indicating a relation between the temperature of the operation fluid and the motor applied voltage.

3. An electric pump, comprising:
    a pump body pumping up and discharging an operation fluid;
    a sensorless brushless motor driving the pump body; and
    means for controlling the motor to perform a constant current control and a constant voltage control to discharge a necessary discharge amount of the operation fluid from the pump body, the means for controlling controls the motor to switch from the constant current control to the constant voltage control at a predetermined temperature of the operation fluid and at a predetermined motor applied voltage,
    wherein the means for controlling controls the motor to switch from the constant current control to the constant voltage control,
    wherein at switching, the means for controlling increasing linearly the motor applied voltage to a motor applied voltage that is higher than the predetermined motor applied voltage when a temperature of the operation fluid is lower than the predetermined temperature to discharge the necessary discharge amount of the operation fluid from the pump body.

* * * * *